United States Patent
Takemura (10) Patent No.: US 7,421,479 B2
(45) Date of Patent: *Sep. 2, 2008

(54) NETWORK SYSTEM, NETWORK CONTROL METHOD, AND SIGNAL SENDER/RECEIVER

(75) Inventor: Shinichi Takemura, Kanagawa (JP)

(73) Assignee: Sony Corporation (JP)

( * ) Notice: Subject to any disclaimer, the term of this patent is extended or adjusted under 35 U.S.C. 154(b) by 460 days.

This patent is subject to a terminal disclaimer.

(21) Appl. No.: 11/088,082

(22) Filed: Mar. 23, 2005

(65) Prior Publication Data

US 2005/0166211 A1 Jul. 28, 2005

Related U.S. Application Data

(63) Continuation of application No. 09/541,980, filed on Apr. 3, 2000, now Pat. No. 6,904,467.

(30) Foreign Application Priority Data

Apr. 6, 1999 (JP) ............... P11-099406

(51) Int. Cl.
*G06F 15/167* (2006.01)
(52) U.S. Cl. ............... 709/213; 709/216; 710/66
(58) Field of Classification Search ......... 709/213, 709/216; 710/66
See application file for complete search history.

(56) References Cited

U.S. PATENT DOCUMENTS

| 5,678,007 A | 10/1997 | Hurvig |
| 5,802,298 A | 9/1998 | Imai et al. |
| 6,182,135 B1 | 1/2001 | Ruane et al. |

FOREIGN PATENT DOCUMENTS

| JP | 61-019254 A | 1/1986 |
| JP | 01-105637 A | 5/1989 |
| JP | 01-161946 A | 6/1989 |
| JP | 02-234534 A | 9/1990 |
| JP | 11-088391 A | 3/1999 |

*Primary Examiner*—Jason Cardone
*Assistant Examiner*—Adnan M Mirza
(74) *Attorney, Agent, or Firm*—Lerner, David, Littenberg, Krumholz & Mentlik, LLP (57) ABSTRACT

A network system connects with processes P1 to P5 that can mutually send and receive a broadcast message specified with no destination and a message specified with a specific process portion and change their states to parent or child processes. For example, process P1 is a parent process and processes P2 to P4 are child processes. When processes P1 to P4 constitute a group, each of child processes P2 to P4 stores parent process P1. Parent process P1 stores each of child processes P2 to P4 that store itself (P1). When process P5 in another group is connected, parent process P1 exchanges a message with process P5 for negotiation to determine either to be a parent process and change the other to a child process.

6 Claims, 11 Drawing Sheets

```
loop{
  wait if (S==S_PARENT) {
      if (E . m_type==M_NOTIFY) {
        if (E . m_addr !=M) (
          assign_P (E. m_addr) ;
          send (P, M_NEGOTIATE , M) ;
          trans (S_NEGOTIATING) ;
        }
      }else
      if (E . m_type==M_FORWARD) {
        ignore ( ) ;
      }else
      if (E . m_type==M_REPORT) {
        if (E . m_addr !=M) {
          assign_P (E. m_addr) ;
          send (P, M_NEGOTIATE , M) ;
          trans (S_NEGOTIATING) ;
        }
      }else
      if (E . m_type==M_NEGOTIATE) {
        assign_P (decide (E. m_addr , M) ;
        if (P==M) {
          send (E . m_addr , M_IAM ,M)) ;
          trans (S_NEGOTIATING) ;
    } else {
          send (E . m_addr , M_YOUARE) ;
      send (P. M_JOIN , M) ;
      send_C (M_FORWARD , P) ;
      empty_C ( ) ;
      trans (S_CHILD) ;
    }
      }else
      if (E . m_type==M_IAM) {
    ignore ( ) ;
      }else
      if (E . m_type==M_YOUARE) {
    ignore ( ) ;
      }else
      if (E . m_type==M_BUSY) {
        ignore ( ) ;
      }else
      if (E . m_type==M_JOIN) {
        add_C (E . m_addr) ;
      }else
      if (E . m_type==M_ERROR) {
        ignore ( ) ;
      }else
      if (E . m_type==M_TIMOUT) {
        broadcast (M_NOTIFY , M) ;
      }
    }else
```

FIG.8

```
if (S==S_NEGOTIATING) {
  if (E . m_type==M_NOTIFY) {
    ignore ( ) ;
  }else
  if (E . m_type==M_FORWARD) {
if (E . m_addr==M) {
    assign_P (M) ;
    trans (S_PARENT) ;
}else{
     assign_P (E. m_addr) ;
     send (P , M_NEGOTIATE , M) ;
}
  }else
  if (E . m_type==M_REPORT) {
    ignore ( ) ;
  }else
  if (E . m_type==M_NEGOTIATE) {
if (P==E . m_addr && decide (P , M)==P) {
  send (E . m_addr , M_YOUARE) ;
}else{
  send (E . m_addr , M_BUSY) ;
}
  }else
  if (E . m_type==M_IAM) {
    assign_P (E . m_addr) ;
    send (P , M_JOIN , M) ;
    send_C (M_FORWARD , P) ;
    empty_C ( ) ;
    trans (S_CHILD) ;
  }else
  if (E . m_type==M_YOUARE) {
    assign_P (M) ;
    trans (S_PARENT) ;
  }else
  if (E . m_type==M_BUSY) {
    send (P , M_NEGOTIATE , M) ;
  }else
  if (E . m_type==M_JOIN) {
    add_C (E . m_addr) ;
  }else
  if (E . m_type==E_ERROR) {
    assign_P (M) ;
    trans (S_PARENT) ;
  }else
  if (E . m_type==E_TIMEOUT) {
    assign_P (M) ;
    trans (S_PARENT) ;
  }
}else
```

FIG.9

```
if (S==S_CHILD) {
  if (E . m_type==E_NOTIFY) {
    if (E . m_addr !=P) {
      send (P , M_REPORT , E . m_addr) ;
    }
  }else
  if (E . m_type==E_FORWARD) {
    assign_P (E . m_addr) :
if (P==M) {
  trans (S_PARENT) ;
}else{
 send (P , M_JOIN , M) ;
}
  }
  if (E . m_type==M_REPORT) {
    send (E . m_form , M_FORWARD , P) ;
  }else
  if (E . m_addr , M_FORWARD , P) ;
    send (E . m_form , M_FORWARD , P) ;
  }else
  if (E . m_type==M_IAM) {
    ignore ( ) ;
  }else
  if (E . m_type==M_YOUARE) {
    ignore ( ) ;
  }else
  if (E . m_type==M_BUSY) {
    send (P , M_JOIN , M) ;
  }else
  if (E . m_type==M_JOIN) {
    send (E . m_addr , M_FORWARD , P) ;
  }else
  if (E . m_type==M_ERROR) {
    assign_P (M) ;
    trans (S_PARENT) ;
  }else
  if (E . m_type==E_TIMEOUT) {
    broadcast (M_NOTIFY , P) ;
    trans (S_PARENT) ;
  }
 }
 }
}
```

FIG.10 addr <information> D[ ]
addr <information> D[ ]
addr <information> D[ ]

| SERVICE IDENTIFIER | ADDRESS | PORT NUMBER |
| --- | --- | --- |
| ． | ． | ． |
| ． | ． | ． |
| ． | ． | ． |

FIG.13

```
loop{
  Update own information as required
  Delete all elements from D[] for the updated line and add M to it if (M_COPY message arrived)
     Modify the table according to the message
     Delete all elements from D[] for the updated line and add addr to it
  }
  if (M_DELETE message arrived) {
     Delete a line with matching addr from the table
  }
  if (this process is parent) {
     for (all lines in the table) {
        if (deleting a line whose addr is not contained in C[]) {
           for (all elements T in C[]) {
              send (T , M_DELETE , addr)
           }
        }
     }
     for(all lines in the table) {
        for (C[] elements T that are not contained in D[]) {
           send (T , M_COPY , addr , <information>)
           Add T to D[]
        }
     }
  } else {
     for (all lines in the table)
        if (addr==M and P not contained in D[])
           send (P , M_COPY , M , <information>)
           Add P to D[]
        }
     }
  }
}
```

FIG.12

| SERVICE IDENTIFIER | ADDRESS | PORT NUMBER |
|---|---|---|
| WWW-service | 192.168.1.1 | 80 |
| file-service | 192.168.1.1 | 2049 |
| print-service | 192.168.1.1 | 515 |

FIG.14

| addr | INFORMATION | | | D[] |
|---|---|---|---|---|
| | SERVICE IDENTIFIER | ADDRESS | PORT NUMBER | |
| 192.168.1.1 | WWW-service<br>file-service<br>print-service | 192.168.1.1<br>192.168.1.1<br>192.168.1.1 | 80<br>2049<br>515 | ... |
| 192.168.1.2 | WWW-service<br>print-service | 192.168.1.2<br>192.168.1.2 | 80<br>515 | ... |
| 192.168.1.3 | WWW-service<br>file-service | 192.168.1.3<br>192.168.1.3 | 80<br>2049 | ... |

FIG.15

NETWORK SYSTEM, NETWORK CONTROL METHOD, AND SIGNAL SENDER/RECEIVER

CROSS-REFERENCE TO RELATED APPLICATIONS

This application is a continuation application of application Ser. No. 09/541,980 filed Apr. 3, 2000 now U.S Pat. No. 6,904,467, the disclosure of which is hereby incorporated by reference herein, and claims priority from Japanese Patent Application No. P11-099406 filed on Apr. 6, 1999.

BACKGROUND OF THE INVENTION

1. Technical Field of the Invention

The present invention relates to a network system for transferring messages and various types of information among application programs or objects in a plurality of nodes, a network control method for controlling the network system, and a signal sender/receiver connected to the network system.

2. Prior Art

A conventional network system can transfer messages and various types of information among application programs or objects (referred to as a process hereafter for a broader term including all of these) in a plurality of nodes. For example, such a network uses the following method to determine a server or a server process. A process having capabilities that can provide a server attempts to find a server currently available on the network using a simple broadcast that specifies no destinations in the network. When not finding an available server, that process itself becomes a server.

Accordingly, when a process (called a client process) other than servers on the network performs some processing, the client process first finds a server process on the network using the above-mentioned broadcast. That client process sends a request to the server process to perform necessary processing.

Determination of a server process using the above-mentioned simple broadcast is frequently applied, for example, when power is turned on for a node on the network, when a node is newly connected to the network, or when a node on the network enters a processing instruction.

PROBLEMS TO BE SOLVED BY THE INVENTION

As mentioned above, the conventional network system determines a server process using the simple broadcast without specifying destinations. It is impracticable to apply the method for determining a server process using the simple broadcast to a large-scale network that connects more than tens of thousands of processes because determining the server process requires a long time. In other words, determination of a server process using the simple broadcast is applicable for only a small-scale network with a limited range to search for server processes.

Further, as mentioned above, the conventional network system determines a server process using the simple broadcast, for example, when power is turned on, when a connection is made to the network, or when a processing instruction is entered. If an error occurs on the server process, for example, each client process can be notified of an error occurrence on the server process only when a server process is determined, namely when power is turned on, when a connection is made to the network, or when a processing instruction is entered. It is impossible to early detect the error occurrence on the server process, thus requiring a time delay before recovering the error or starting a recovery action. In other words, each client process is subject to restrictions on network processing until the server process recovers from the error.

The present invention takes these situations into consideration. It is an object of the present invention to provide a network system, a network control method, and a signal sender/receiver that can flexibly comply with various network configurations and allow each process to continue necessary processing even if a network error occurs.

BRIEF SUMMARY OF THE INVENTION

Means for Solving the Problems

A network system according to the present invention can mutually send and receive a message specified with no destination and a message specified with a specific process portion. The network system connects with a process portion that can change its own state to a first or second state. The network system solves the above-mentioned problems by comprising a first-state process portion that stores a second-state process portion storing the first-state process portion and the second-state process portion that stores the only first-state process portion and by using the single first-state process portion.

A network control method according to the present invention can mutually send and receive a message specified with no destination and a message specified with a specific process portion. The network control method controls a network connecting with a process portion that can change its own state to a first or second state. The network control method solves the above-mentioned problems by allowing a first-state process portion to store the second-state process portion storing the first-state process portion, allowing a second-state process portion to store the only first-state process portion, and using the single first-state process portion in the network.

A signal sender/receiver according to the present invention comprises message generation means, message analysis means, state control means, and storage means. The message generation means can at least generate a message specified with a specific destination and a message specified with no destination. The message analysis means receive a message and analyze its contents. The state control means change the state of the signal sender/receiver itself to the first or second state depending on whether another networked apparatus is available and whether another apparatus remains in the first or second state. The storage means can store information about the signal sender/receiver itself and other apparatuses. The signal sender/receiver solves the above-mentioned problems as follows. When the only other apparatus in the first state stores information about the signal sender/receiver itself and is connected to the network, the signal sender/receiver sets its state to the second state and stores information about the other apparatus in the first state. When another apparatus in the second state stores information about the signal sender/receiver in the first state and is connected to the network, the signal sender/receiver stores information about the other apparatus in the second state storing information about the signal sender/receiver itself.

As described above, it will be apparent that the network system and the network control method according to the present invention are flexibly applicable to various network configurations. Even if a network error occurs, each process can continue necessary processing. For providing these advantageous effects, the first-state process portion stores the second-state process portion that stores the first-state process portion. The second-state process portion stores the only first-state process portion. Only one first-state process is available.

The signal sender/receiver according to the present invention is flexibly applicable to various network configurations. Even if a network error occurs, each process can continue necessary processing. For providing these advantageous effects, when the only other apparatus in the first state stores information about the signal sender/receiver itself and is connected to the network, the signal sender/receiver sets its state to the second state and stores information about the other apparatus in the first state. When another apparatus in the second state stores information about the signal sender/receiver in the first state and is connected to the network, the signal sender/receiver stores information about the other apparatus in the second state storing information about the signal sender/receiver itself

DETAILED DESCRIPTION OF THE INVENTION

Preferred Embodiments of the Invention

Embodiments of the present invention will be described in detail, with reference to the accompanying drawings.

Figure 1:
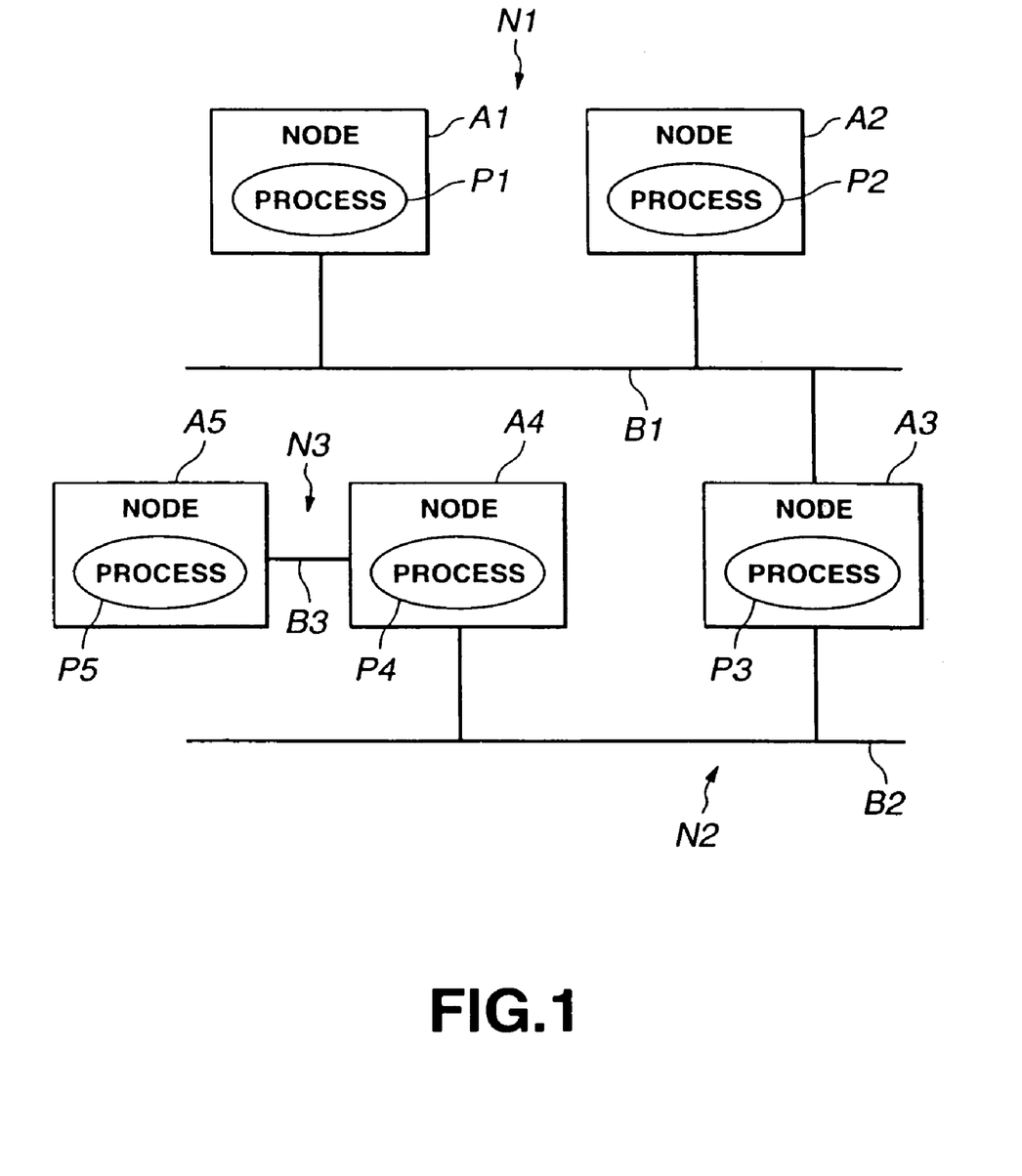
FIG. 1 is a schematic diagram showing an outline configuration of a network system as an embodiment to which the network system and the network control method according to the present invention are applied.

FIG. 1 shows an outline configuration of a network system as an embodiment to which the network system, the network control method, and the signal sender/receiver according to the present invention are applied.

In FIG. 1, the network system according to the embodiment of the present invention comprises processes P1, P2, P3, P4, and P5, nodes A1, A2, A3, A4, and A5 (such as a computer having a signal send/receive capability and the like), bus-type network segments B1 and B2, and a one-to-one connection segment B3. Processes P1, P2, P3, P4, and P5 can perform various types of processing such as providing information and services. Nodes A1, A2, A3, A4, and A5 are provided with processes P1, P2, P3, P4, and P5. All of these components constitute a network that can transmit messages.

FIG. 1 shows an example of a network system comprising networks N1, N2, and N3 that are combined to form a single network. Network N1 comprises processes P1, P2, and P3 (nodes A1, A2, and A3) connected to bus-type segment B1. Network N2 comprises processes P3 and P4 (nodes A3 and A4) connected to bus-type segment B2. Network N3 comprises processes P4 and P5 (nodes A4 and A5) connected to one-to-one connection segment B3.

For this network system, messages must be correctly routed so that processes in the network can communicate with all the other processes by sending or receiving messages.

Each process can send information about its address, feature, specification, operational state, and the like (called a feature and the like as needed) as a message to other processes on the network. When receiving information about the feature and the like as a message from the other processes, each process can store information about the feature and the like received from the other processes. When the feature and the like change in the process, each process can send a message about that change to the other processes. When a process receives the message about a change in the feature and the like, the process changes (updates) the already stored information about features and the like for the other processes in response to that message. Each process can copy or transfer information about addresses or features and the like for the other processes. When each process detects a process whose existence is unidentifiable due to an error, the process can delete information about the address or the feature and the like for that process from the storage.

Each process on the network can manage information about addresses, features and the like for all the other processes in the network. Each process can also allow the other processes to manage information about addresses, features and the like for all the other processes in the network. The following description uses terms: parent and child processes. A parent process manages information about addresses, features and the like for all the other processes in the network. A child process is subject to management of the corresponding parent process with respect to the address, the feature and the like. States of parent and child processes may change depending on message exchanges with the other processes or other factors. Initially, all processes are parent processes.

The parent process stores that it is a parent process. The child process stores that it is a child process. The child process stores one parent process. The parent process stores all child processes that store the parent process itself. In FIG. 1, suppose that only network N1 is formed. It comprises processes P1, P2, and P3 connected to bus-type segment B1. Also suppose that process P1 is a parent process and that processes P2 and P3 are child processes. Process P1 stores that it is a parent process and that processes P2 and P3 are child processes. Processes P2 and P3 store that they are child processes and that process P1 is a parent process.

A plurality of processes (including child and parent processes) storing the same parent process constitutes a single group. In FIG. 1, suppose that there is only a network that is a combination of networks N1 and N2. Networks N1 and N2 comprise processes P1, P2, P3, and P4 connected to bus-type segments B1 and B2. Also suppose that process P1 is a parent process and that processes P2, P3, and P4 are child processes. These processes P1, P2, P3, and P4 form a single group. Initially, as described above, all processes are parent processes. Each of all processes independently forms a specific group in an initial state.

Each child process belonging to the same group copies information such as its address, feature, specification, operational state and the like to the parent process in the same group. Accordingly, the parent process can maintain information such as addresses, features and the like about all child processes in the corresponding group. Further, the parent process can copy the stored information such as addresses, features and the like to all child processes the parent process itself stores. A child process in the group can access the parent process in the same group to obtain all the information the parent process maintains. Accordingly, processes in a given group can share various types of information maintained by each process in the same group. All processes in the same group can own all the information for each process in the same group. In addition, each process has information that describes means for accessing services the process itself provides. In the same manner as described above, this access information can be also copied to all processes. Therefore, all processes in the same group can access services of the other processes in that group. Even if various errors occur or the network configuration changes, each process in the same group can share various types of information and can access other processes in that group.

It is possible to broadcast messages between processes in the same group. The message broadcasting is unavailable for a process that did not belong to the group and is newly connected to the group or for a networked process that does not belong to the same group. It is only possible to exchange messages specified with addresses. In FIG. 1, suppose that processes P1, P2, P3, and P4 form a group. When process P5 is newly connected to process P4 and does not belong to the group yet, for example, it is possible to broadcast messages among processes P1, P2, P3, and P4. However, only exchanging address-specified messages is available between process P5 and one of processes P1, P2, P3, and P4.

Suppose that a process is newly connected to a group and does not belong to that group. All processes already belonging to the group can send a message indicating the parent process of this group to the process that is newly connected to the group and does not belong to that group.

When a connection is made between processes each of which belongs to one of two different groups, each connected process sends a message indicating the parent process of the associated group to the process in the destination group. When receiving this message from the corresponding process, the other process transfers that message to the parent process of the associated group. In FIG. 1, suppose that a group comprises parent process P1 and child processes P2 and P3 and that another group comprises parent process P5 and child process P4. When a new connection is made between processes P3 and P4, for example, process P3 sends to process P4 a message indicating parent process P1 of the group to which process P3 belongs. Process P4 sends to process P3 a message indicating parent process P5 of the group to which process P4 belongs. When receiving from process P4 the message indicating parent process P5 of the group, process P3 transfers that message to parent process P1 of the group to which process P3 belongs. Similarly, when receiving from process P3 the message indicating parent process P1 of the group, process P4 transfers that message to parent process P5 of the group to which process P4 belongs.

As described above, when receiving a message indicating existence of the parent process for the other group, each parent process exchanges the message with the other parent process. Then, either parent process changes to a child process. In FIG. 1, suppose that process P1 is a parent process for one group and that process P5 is a parent process for the other group. After processes P1 and P5 exchange messages, either changes to a child process. There can be various factors to determine which parent process should be a child process. For example, the parent process that can be a child process may contain the smaller number of child processes belonging to the group or have less intelligent features than the other parent process.

When the parent process becomes a child process due to a connection between two different groups, that parent process makes a new parent process known to all child processes the parent process stores currently. The parent process transfers information about all these child processes to a new parent process. In FIG. 1, suppose that process P1 is a parent process for one group and that process P5 is a parent process for the other group. When process P5 changes to a child process, process P5 sends to child process P4 a message indicating that process P1 will become a new parent process. Process P5 also sends to process P1 a message containing various types of information such as the address and the feature and the like of process P5 itself and the address and the feature and the like of process P4.

As described above, when the parent process in the group changes to a child process, another child process receives a message indicating a new parent process from that parent process. This child process stores the new parent process and notifies it of the feature and the like of the child process itself by sending a message. Thus, the child process is stored in the new parent process. In FIG. 1, suppose that process P5 is a parent process and process P4 is a child process. When process P5 notifies process P4 that process P1 is a new parent process, process P4 stores the new parent process P1 and notifies it of the feature and the like of process P4 itself by sending a message. Consequently, parent process P1 stores P4 as a child process.

When two different groups are connected and the parent process in one group changes to a child process, the parent process in the other group stores processes in its own group and the other group as child processes. In this case, these two groups are integrated into one group. Unifying groups makes it possible to broadcast messages specified with no destinations among processes originally belonging to different groups.

For example, the parent process becomes incapable of identifying existence of a child process in the group due to occurrence of an error and the like in the group. In this case, the parent process removes the child process whose existence is unidentifiable from the storage. In FIG. 1, suppose that process P1 is a parent process and process P5 is a child process. For example, an error occurs on one-to-one connection segment B3 (network N3). Alternatively, parent process P1 cannot communicate with child process P5 because process P5 is disconnected from the network. In these situations, parent process P1 removes child process P5 from child processes stored in parent process P1.

When a child process cannot identify existence of the parent process stored in that child process due to an error in the group, for example, the child process is assumed to leave itself from the associated group. Similarly to an initial state, the child process forms a specific group and becomes a parent process. In FIG. 1, suppose that process P1 is a parent process and process P5 is a child process. For example, process P5 cannot communicate with parent process P1 because an error occurs on one-to-one connection segment B3 (network N3), or because process P5 is disconnected from the network. In these situations, process P5 forms a specific group and becomes a parent process.

As described above, the network system according to this embodiment promptly resumes a state in which only one parent process is available within a group. In the network system according to this embodiment, there may be cases where an error occurs on the network in the group, an error is corrected to restore the network to normal, or the network configuration is modified to change the network environment. In any of these cases, the network system can comply with a new environment and promptly resumes a state in which only one parent process is available within a group. When only one parent process becomes available in a group, all child processes in the group store a single parent process. The parent process stores all child processes. In FIG. 1, suppose that process P1 is a parent process and the other processes P2, P3, P4, and P5 are child processes. Parent process P1 stores all child processes P2, P3, P4, and P5. Each of child processes P2, P3, P4, and P5 stores process P1 as the parent process.

The above description has outlined basic operations of the network system according to the embodiment of the present invention. These operations can be represented in flow charts in FIGS. 2 to 7.

Figure 2:
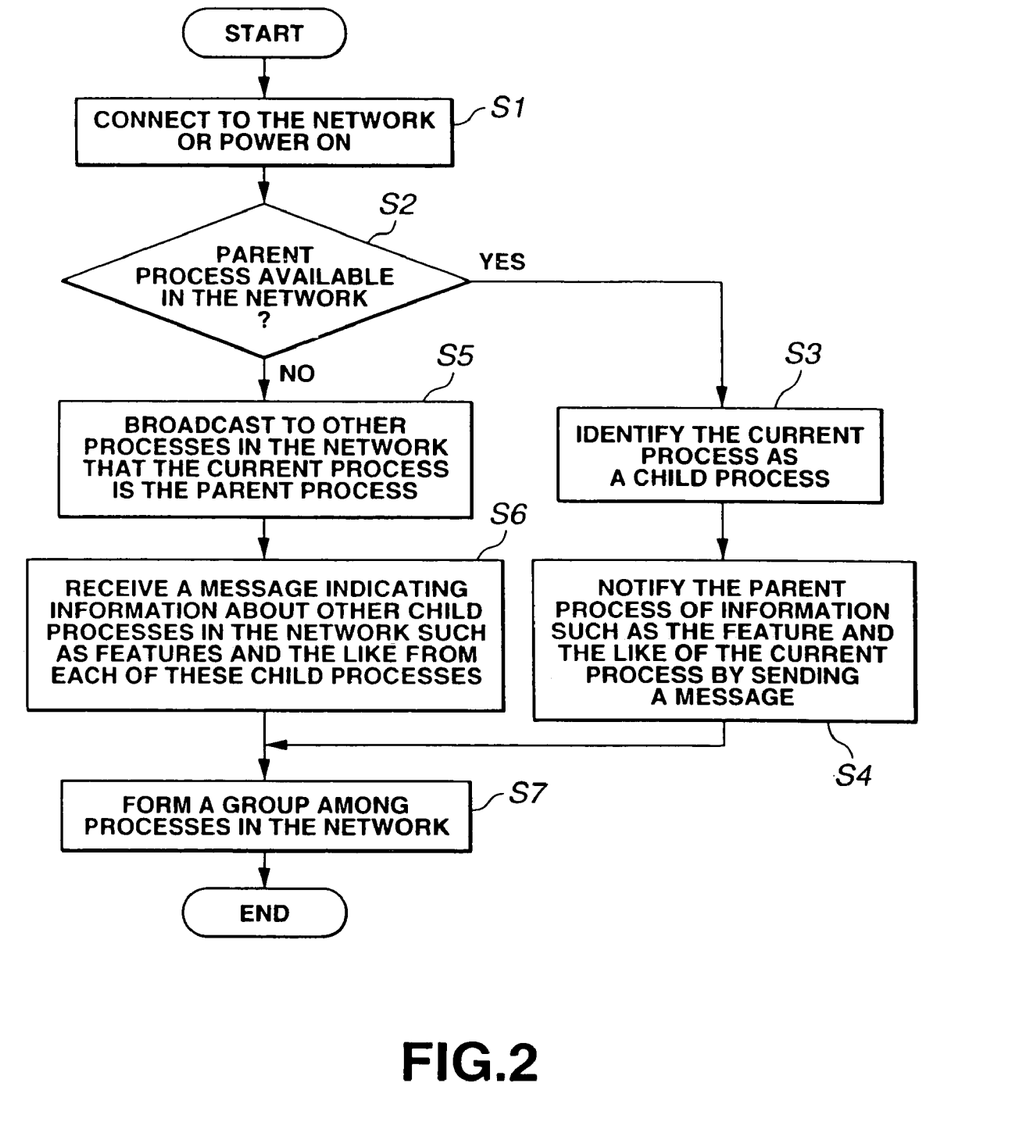
FIG. 2 is a flow chart showing how a process becomes a parent or child process.

FIG. 2 provides a basic operation of the network system according to the embodiment of the present invention. Specifically, when a process is connected to the network or is powered on, for example, FIG. 2 shows a flow of processing until the associated process becomes a parent or child process.

In FIG. 2, a process is connected to the network or is powered on at step S1. Execution is passed to step S2 to check if there is a parent process in the network. The decision of step S2 is based on whether the group contains a process other than the current one or whether another process in the group issues a message indicating existence of a parent process.

When step S2 determines that a parent process already exists, step S3 identifies that the current process is a child process. Step S4 to follow notifies the parent process of information about the current process such as the feature and the like by sending a message.

When step S2 determines that no other parent process exists, step S5 broadcasts to other processes in the network that the current process is a parent process.

Then, step S6 receives a message containing information about other child processes such as features and the like from each child process in the network. Step. S7 creates a group of processes in the network.

Figure 3:
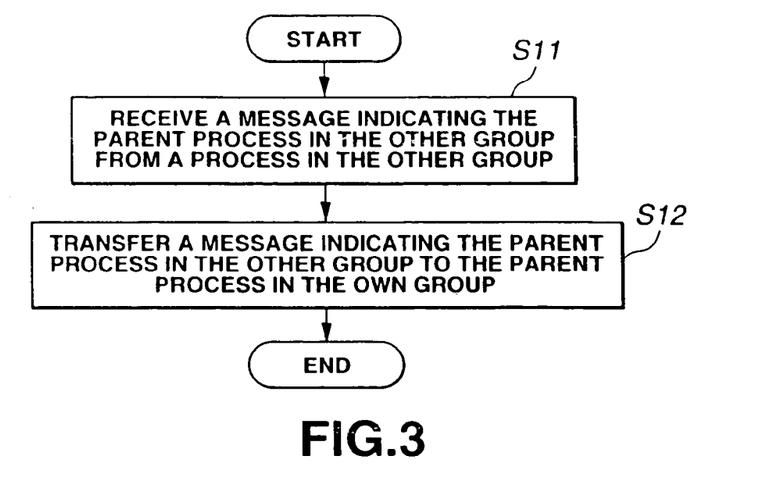
FIG. 3 is a flow chart showing a flow of processing for a process connected to another process, each of these processes belonging to one of two groups.

FIG. 3 provides a basic operation of the network system according to the embodiment of the present invention. Specifically, when a connection is made between processes either of which belongs to one of two different groups, for example, FIG. 3 shows a flow of processing for the connected process.

In FIG. 3, when a connection is made between processes either of which belongs to one of two different groups, the connected process at step S11 receives a message indicating the parent process for the other group from a process in the other group.

After receiving the message indicating the parent process in the other group at step S11, the process at step S12 transfers that message to the parent process in its own group.

Figure 4:
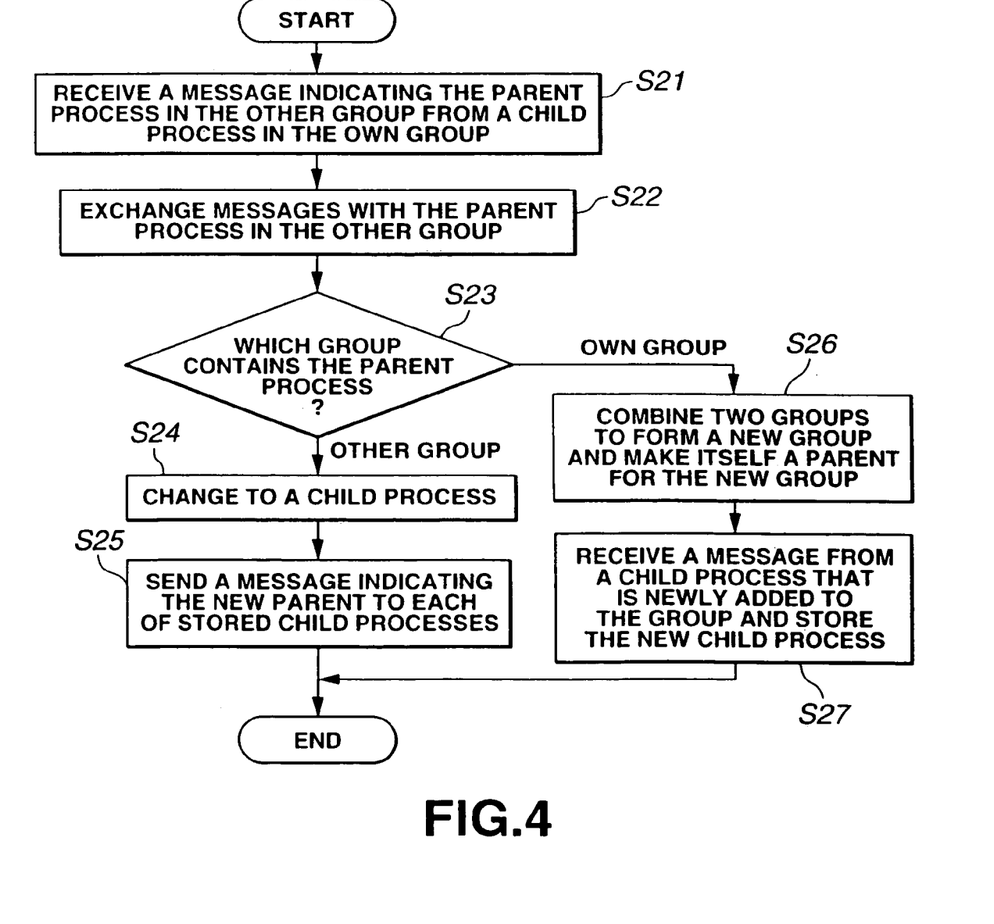
FIG. 4 is a flow chart showing a flow of processing in a parent process that receives a message about a parent process in another group from a child process in an own group.

FIG. 4 provides a basic operation of the network system according to the embodiment of the present invention. Specifically, FIG. 4 shows a flow of processing for the parent process, for example, when it receives a message indicating the parent process in the other group from a child process in the own group.

At step S21 in FIG. 4, the parent process receives a message indicating the parent process in the other group from a child process in the own group. At step S22, that parent process receiving the message exchanges messages with the parent process in the other group.

At step S23, the parent process determines whether this parent process itself or the parent process in the other group should be the final parent process. The decision can be made by comparing the number of child processes or the levels of features and the like.

When step S23 allows the current parent process to be the parent process in the own group, execution is passed to step S27 and the subsequent steps; When step S23 allows the parent process in the other group to be the parent process in the own group, execution is passed to step S24 and the subsequent steps.

When step S23 allows the parent process in the other group to be the parent process in the own group, the current parent process changes to a child process at step S24. At step S25, this process sends a message indicating a new parent process (parent process in the other group) to each of child processes formerly stored in itself.

When step S23 allows the current parent process to be the parent process in the own group, it becomes the parent process for a new group comprising two groups at step S26. Then at step S27, the parent process receives messages from child processes (those that belonged to the other group) newly added to the group and stores information about these processes.

Figure 5:
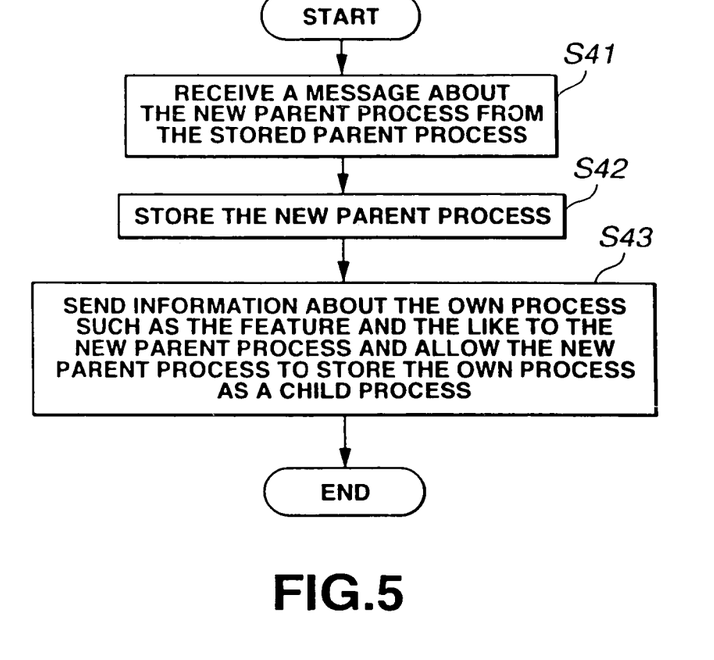
FIG. 5 is a flow chart showing a flow of processing for the child process when the parent process changes to a child process to generate a new parent process.

FIG. 5 provides a basic operation of the network system according to the embodiment of the present invention. Specifically, FIG. 5 shows a flow of processing for a child process, for example, when the child process is placed under control of a new parent process after the parent process of the group for this child process changes to a child process.

At step S41 in FIG. 5, the process receives a message about a new parent process from the parent process the child process itself stored. That process receiving the message stores a new parent process at step S42.

Then at step S43, this process sends information about itself such as its feature and the like to the new parent process and allows the new parent process to store itself as a child process.

Figure 6:
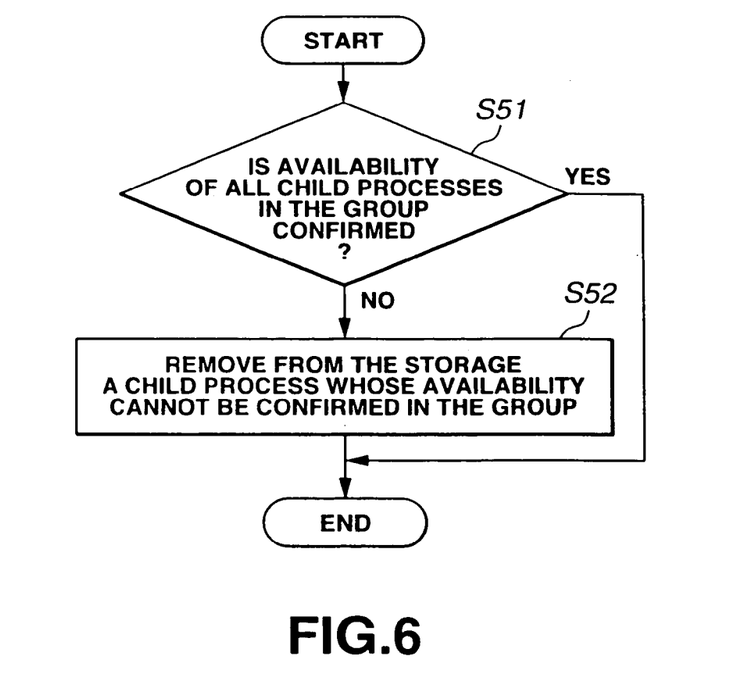
FIG. 6 is a flow chart showing a flow of processing for the parent process when it cannot determine existence of the child process due to an error.

FIG. 6 provides a basic operation of the network system according to the embodiment of the present invention. Specifically, FIG. 6 shows a flow of processing for the parent process, for example, when it cannot verify existence of a child process in the group due to an error therein.

At step S51 in FIG. 6, the parent process checks if it is possible to confirm existence of all child processes in the group to which the parent process belongs. When the parent process can confirm the existence of all child processes in the group, the processing terminates. Alien the parent process cannot confirm existence of a child process, execution proceeds to step S52.

When the parent process determines that there is a child process whose existence cannot be confirmed at step S51, the parent process removes that child process from the storage at step S52.

Figure 7:
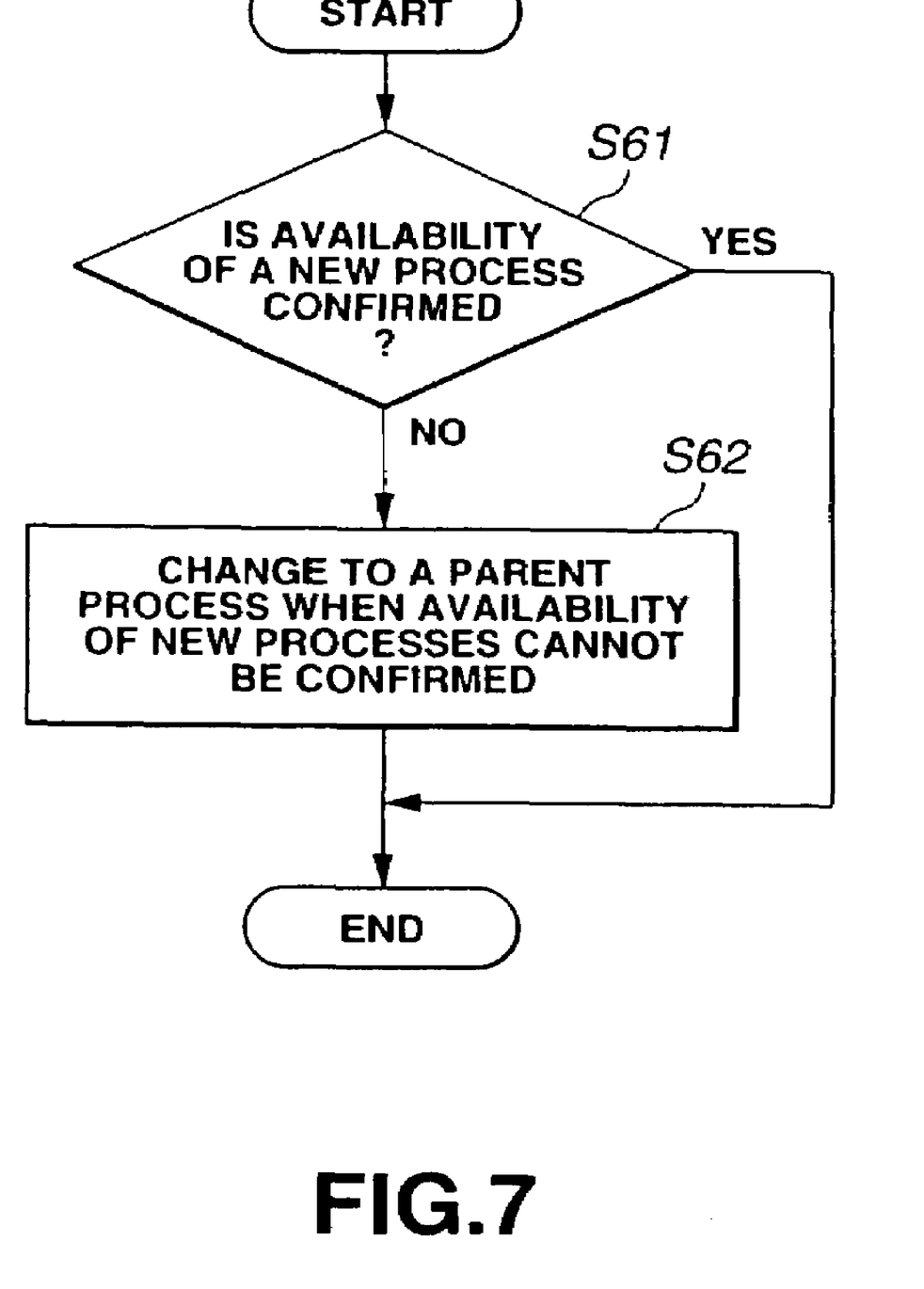
FIG. 7 is a flow chart showing a flow of processing for the child process when it cannot determine existence of the parent process due to an error.

FIG. 7 provides a basic operation of the network system according to the embodiment of the present invention. Specifically, FIG. 7 shows a flow of processing for a child process, for example, when it cannot verify existence of the parent process stored in that child process due to an error in the group.

At step S61 in FIG. 7, a child process checks if it is possible to confirm existence of the parent process in the group to which that child process belongs. When the child process can confirm the existence of the parent process in the group, the processing terminates. When the child process cannot confirm existence of the parent process, execution proceeds to step S62.

When the child process cannot confirm existence of the parent process at step S61, the child process forms a specific group and becomes the parent process in that group at step S62.

The above description provides several basic operations of the network system according to the embodiment of the present invention using flow charts in FIGS. 2 to 7. It is also possible to express these operations of the network system according to the embodiment of the present invention using a technique that complies with the C language in FIGS. 8 to 10. An originally single sequence of codes is divided into these FIGS. 8 to 10 for readability.

Figure 8:
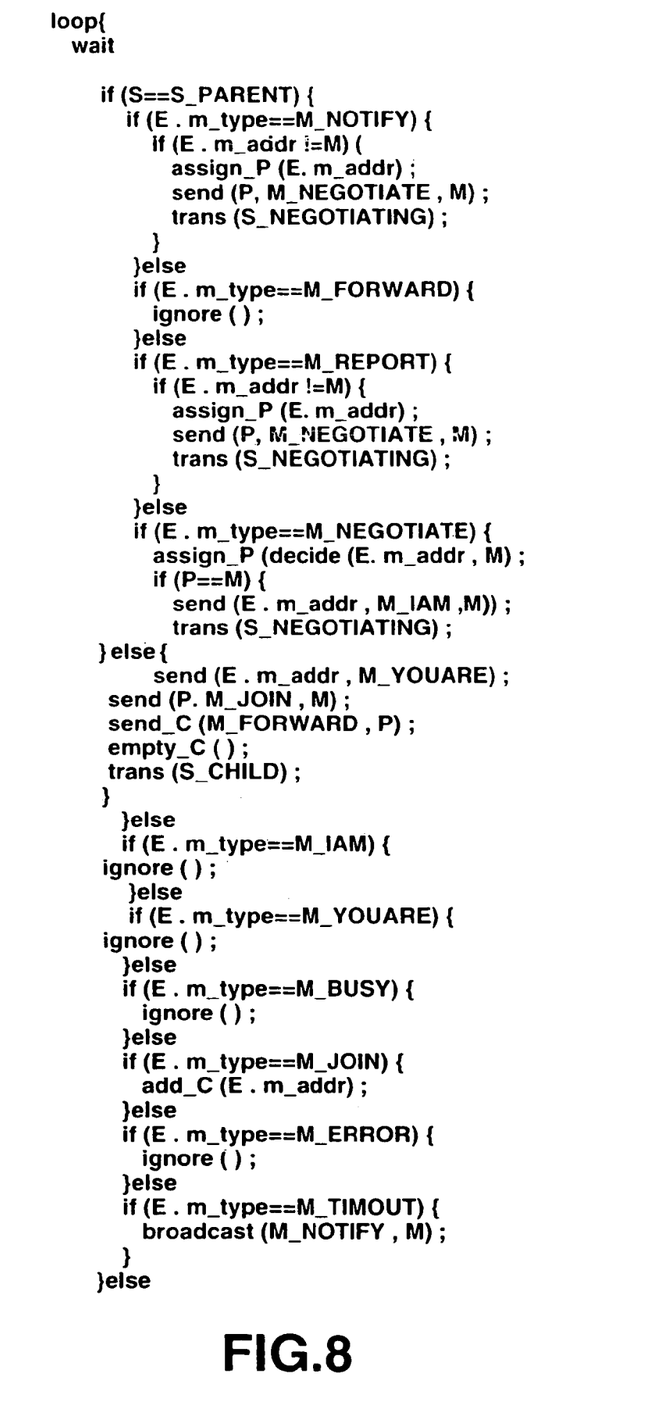
FIG. 8 shows a flow of operations for a child process in the parent process state.
Figure 9:
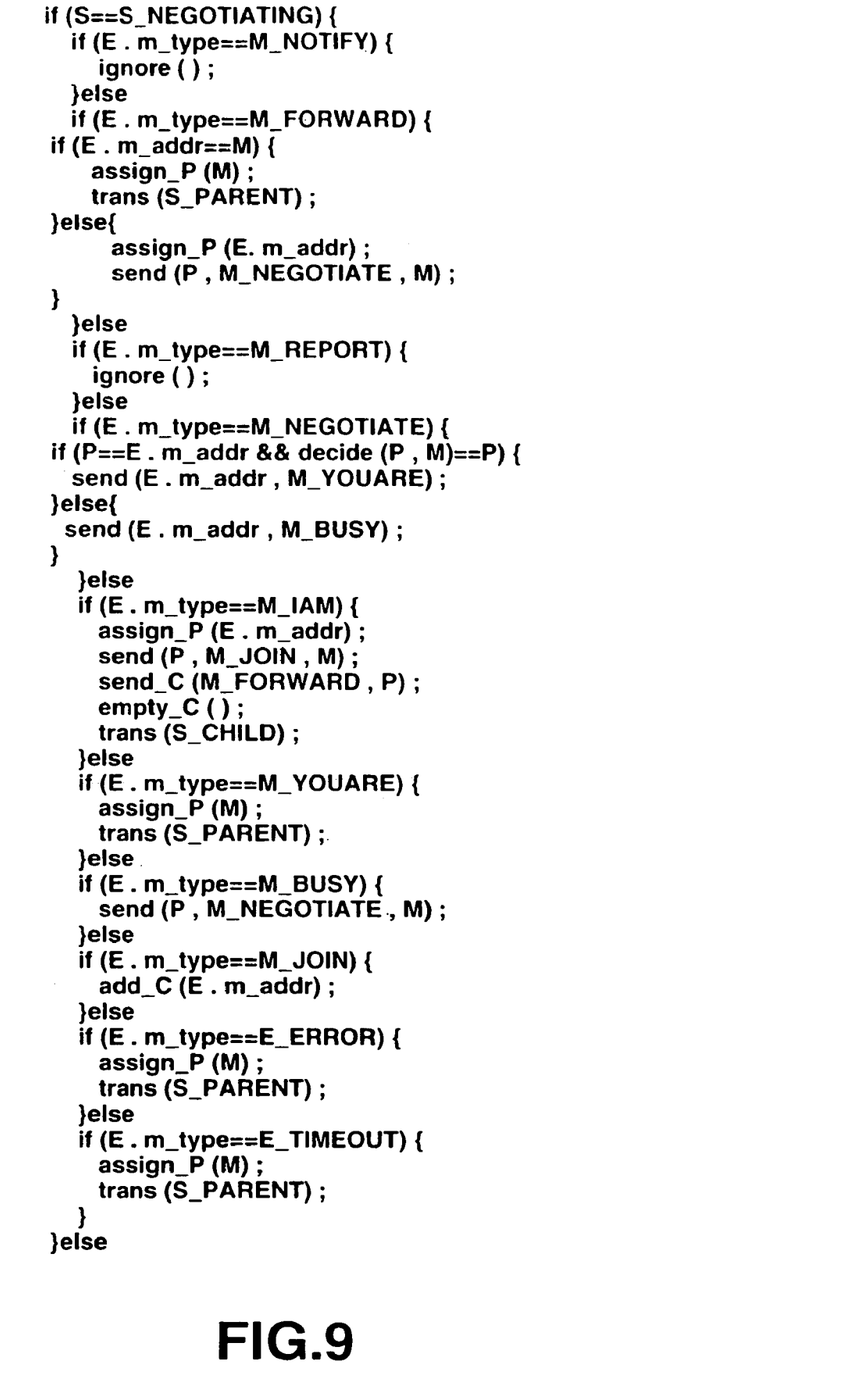
FIG. 9 shows a flow of operations for a process in the child process state.
Figure 10:
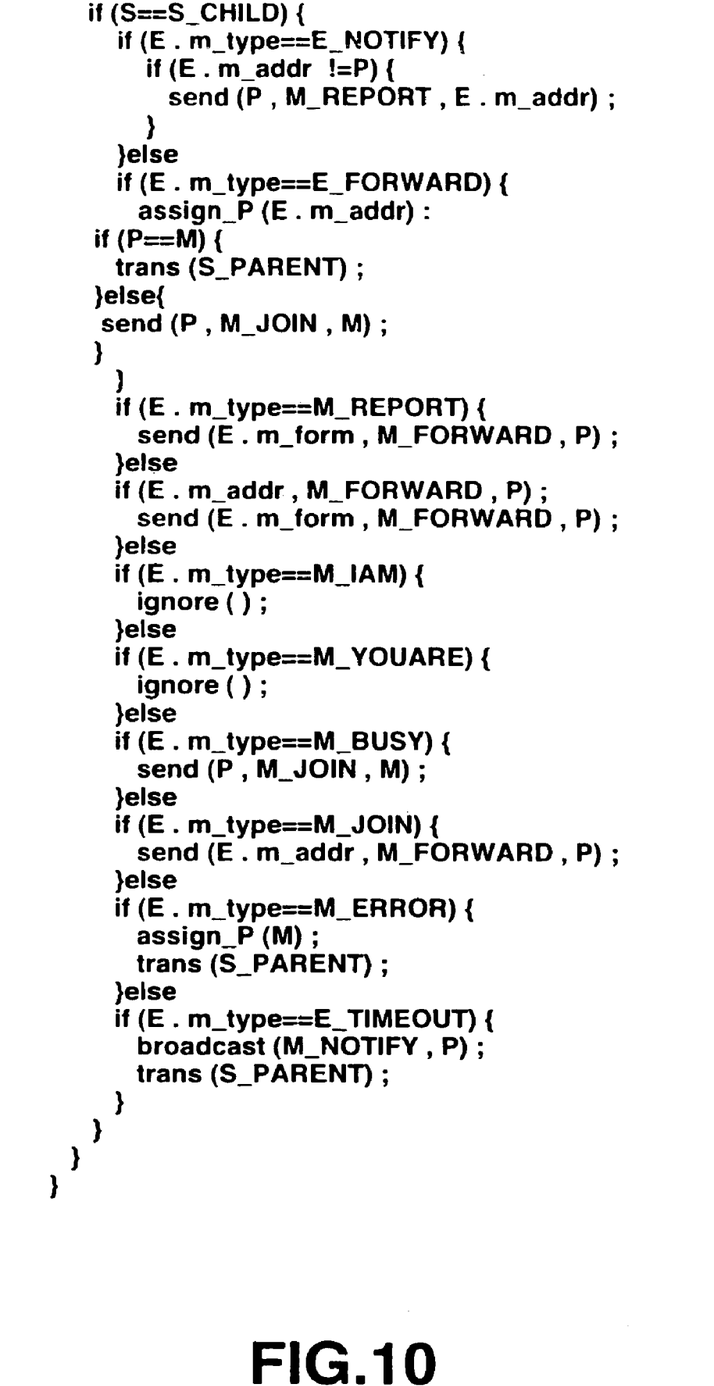
FIG. 10 shows a flow of negotiation operations for determining a new parent process among parent processes.

In FIG. 8, the process is a parent process. FIG. 8 shows a flow of processing in which the parent process sends a message to other processes and changes to a child process or an intermediate state in response to a received message or an error occurrence. In FIG. 9, the parent process is placed in an intermediate state in which the parent process is exchanging messages with the parent process in the other group. FIG. 9 shows a flow of processing in which the parent process sends messages to other processes and changes to a child or parent process in response to a received message or an error occurrence. In FIG. 10, the process is a child process. FIG. 10 shows a flow of processing in which the child process transfers a message to the parent process, sends a message to other processes, or changes to a parent process in response to a received message or an error occurrence.

The following describes arguments, operations, and functions used in FIGS. 8 to 10.

Processes use the following messages. Each message requires zero or more arguments.

The M_NOTIFY addr message is used for unidirectionally notifying other processes of the own parent process address. The addr argument indicates the parent process address. This notification occurs at a given time periodically. When a plurality of processes is available, for example, the message is broadcast to processes placed in a list of addresses. For a one-to-one cable connection, the notification is sent to the destination process.

The parent process uses the M_FORWARD addr message to notify a child process that the parent process is changed. The addr argument indicates a new parent process address.

A child process uses the M_REPORT addr message to notify the parent process that the other parent process is available. The addr argument indicates the other parent process address.

The M_NEGOTIATE addr message is used for determining a new parent process between existing parent processes. The addr argument is omissible when it is identifiable according to a sender address and a destination address prefixed to the message.

The parent process sends the M_IAM addr message to the other parent process to declare that the message-sending process is a new parent process. The addr argument indicates a new parent process address. The addr argument is omissible when it is identifiable according to a sender address and a destination address prefixed to the message.

The M_YOUARE message is used to declare to the other parent process that the message-sending process is a new child process.

The M_BUSY message is used to request to retransmit the most recent message.

The M_JOIN addr message is used to register a child process in the parent process. The addr argument is omissible when it is identifiable according to a sender address and a destination address prefixed to the message.

In addition to reception of the above-mentioned messages, the following events occur internally.

E_ERROR indicates that an error occurred.

E_TIMTEOUT indicates that a specified time has elapsed after a specific message is received or an event occurs.

The system maintains any of the following states.

S_PARENT indicates a state in which a parent process is active.

S_NEGOTIATING indicates a state in which neither a parent process nor a child process is active.

S_CHILD indicates a state in which a child process is active.

The system uses the following internal variables.

P indicates a parent process address.

C[ ] indicates a plurality of child process addresses.

M indicates an own process address (constant).

S indicates the current state.

E indicates the most recently received message or the most recently generated event.

The following operations are defined.

send<destination><message> . . . indicates that message <message> . . . is to be sent to <destination>. When a plurality of <destination> is available, the message is sent to each of these destinations.

broadcast<message> . . . indicates that message <message> . . . is to be broadcast.

add_C<addr> indicates that <addr> is to be added to C[ ].

empty_C indicates that C[ ] is to be emptied.

assign_P<addr> indicates that value P is to be replaced by <addr>.

trans<state> indicates that state S is to be changed to <state>.

wait indicates that the system waits until a message is received or until an event occurs. The received message or the generated event is stored in E.

ignore indicates that the system does nothing.

The following function is defined.

decide(<a>,<b>) indicates that <a> or <b> is to be selected and returned.

The following shows possible enhancements of the network system according to the embodiment of the present invention.

Examples include:

Detecting a communication error with the parent process using a ping (program to issue a response request to the destination host using ICMP that is one of high-level IP protocols) and a timeout condition that takes effect due to no response after a specified interval;

Detecting a communication error with the parent process by means of a disconnection from TCP/IP (Transmission Control Protocol/Internet Protocol);

Detecting a communication error with the parent process by detecting a carrier signal;

Detecting a communication error with child processes and removing a child process that caused an error from C[ ];

Checking message source addresses and ignoring invalid ones;

Protecting the system against an unauthorized access using the check facility such as a password;

Providing messages with group identifiers to determine the parent process for each group;

Allowing a single process to participate in a plurality of groups;

Using a one-way notification to a specific address in addition to broadcasting;

Providing a hierarchical relationship among parent and child processes;

Improving an unreliable communication such as UDP; and

Changing a timeout condition according to the contents of received units such as packets or transmitted packets.

The following describes a copy facility for copying information between processes.

To copy information, each process uses messages in the following formats.

Message formats to be used are M_CORPY addr <information> and M_DELETE addr. In these messages, addr indicates a copy source address.

Figure 11:
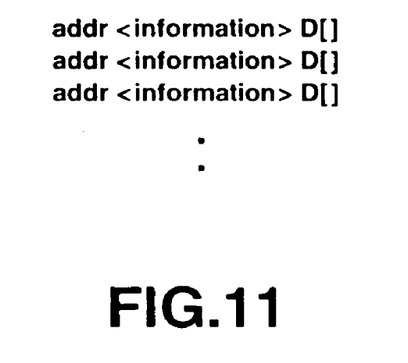
FIG. 11 shows a basic table structure each process should store for providing a copy operation.

In this case, each process stores information using a table shown in FIG. 11.

In this table, addr indicates a copy source process address. D[ ] is a list of processes whose information is copied. The use of D[ ] helps determine whether the information is already copied.

Figure 12:
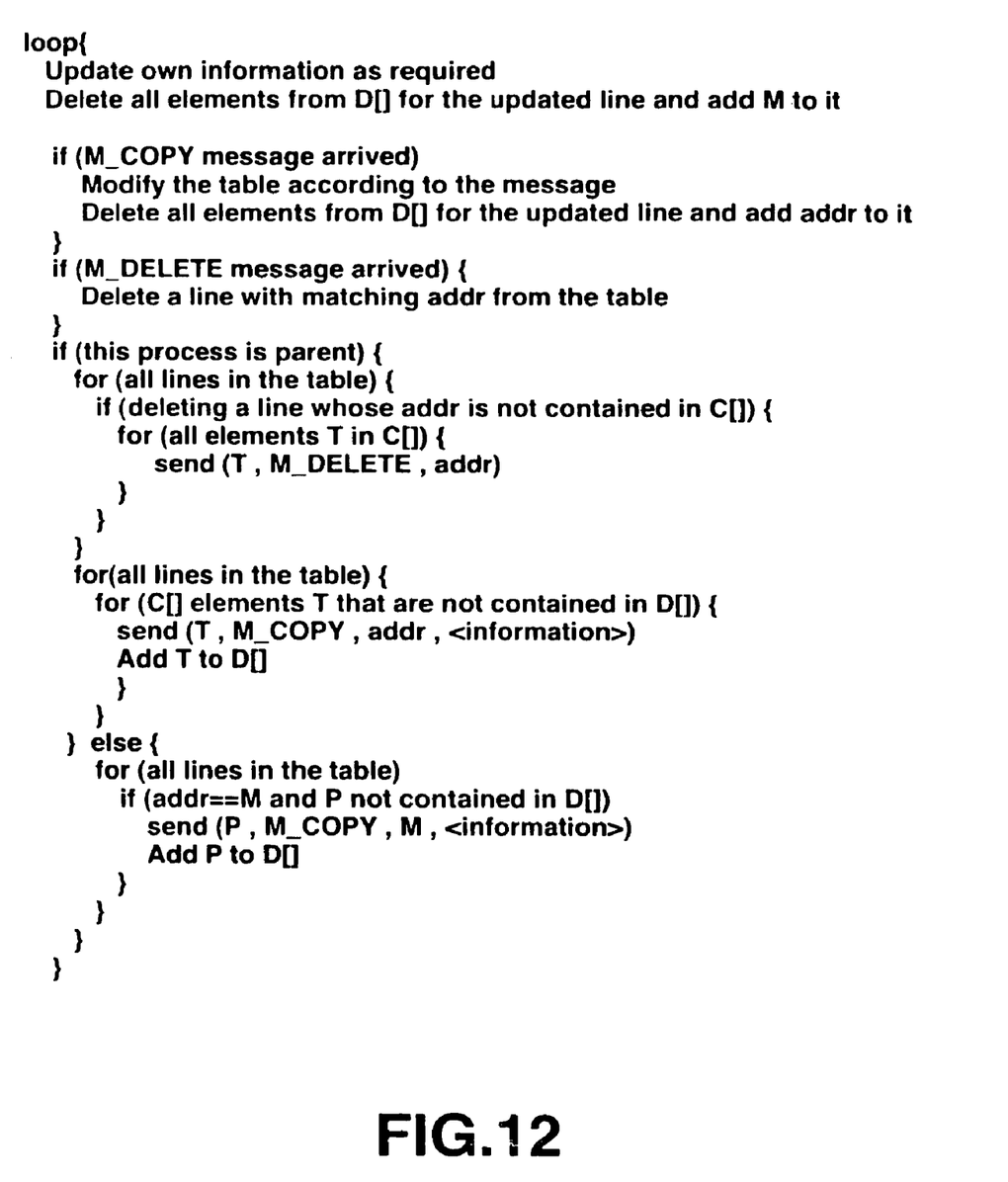
FIG. 12 shows a flow of copy operations.

As shown in FIG. 12, a flow of the copy facility can be expressed using a technique that complies with the C language. FIG. 12 shows a flow of processing in which information is copied from a child process to the parent process and from the parent process to all child processes.

The following shows possible enhancements of the copy facility according to the embodiment of the present invention. Examples include:

Allowing a child process to discard unnecessary information without storing it out of information copied from the parent process;

Allowing a child process to notify the parent process of necessary information beforehand to prevent unnecessary information from being sent to the M_COPY message; and Improving modification of information by sending process information using a plurality of M_COPY messages instead of sending the information at a time using a single M_COPY message.

The following describes addresses and the like used for an access between processes.

Figure 13:
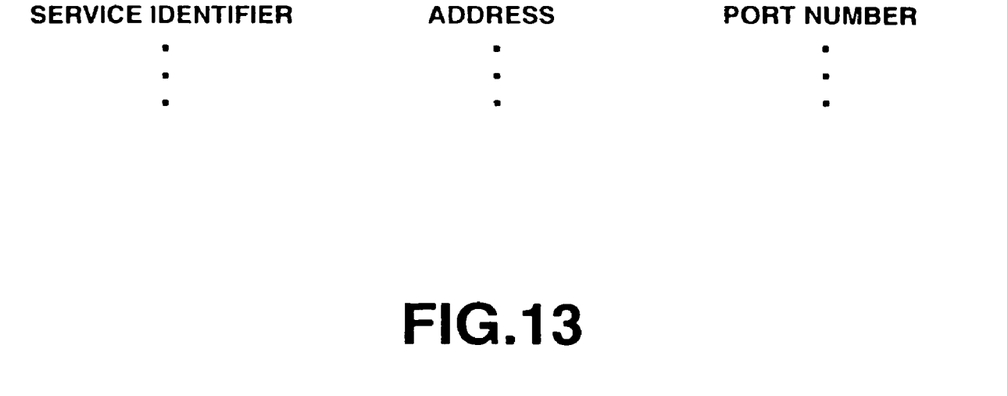
FIG. 13 shows a basic table structure each process should store for accessing each process service.

Using means for accessing services, processes providing services can share information comprising a service identifier, an address, and a port number as shown in FIG. 13 by storing this information in a table.

Figure 14:
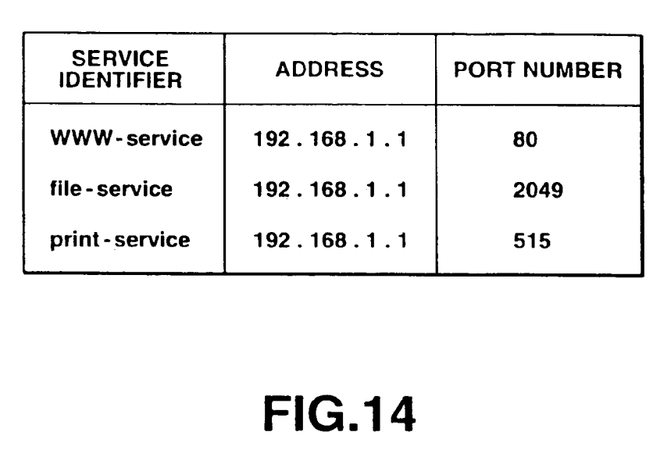
FIG. 14 shows a table example comprising service identifiers, addresses and port numbers.

More specifically, processes share information by storing a table comprising a service identifier, an address, and a port number as shown in FIG. 14. In FIG. 14, the service identifier uses a character string. The process address and port number correspond to the TCP/IP address and port number, respectively. FIG. 14 shows an example of the table that provides a WWW (World Wide Web) service, a file service, and a print service. Service identifiers for these services are WWW-service, file-service, and print-service, respectively. Pairs of the TCP/IP address and port number address for these services correspond to 192.168.1.1 and 80, 192.168.1.1 and 2049, and 192.168.1.1 and 515.

Figure 15:
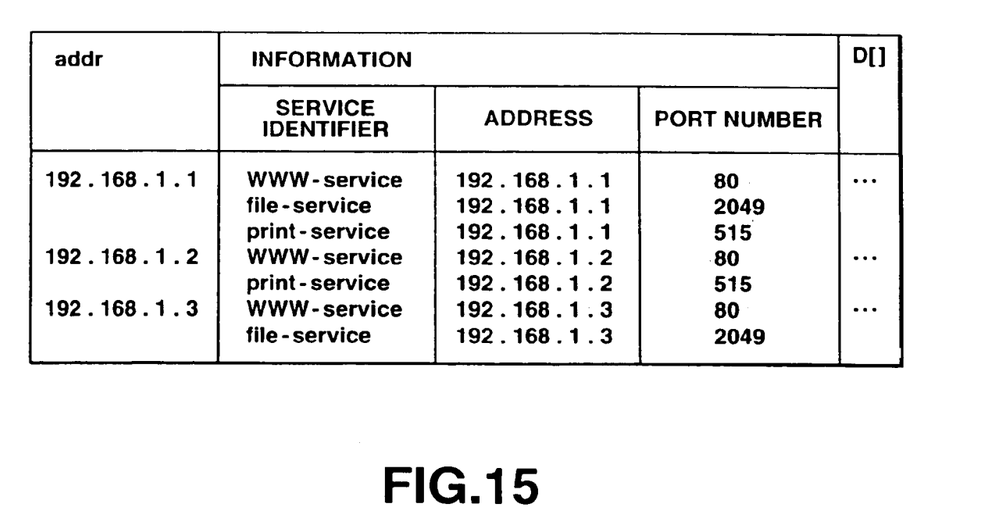
FIG. 15 shows a table example when each process shares information.

When processes share that information, each process uses a table shown in FIG. 15. As described above, addr in FIG. 15 indicates a copy source address. Corresponding to this addr, a service identifier, an address, and a port number are provided. The contents of service identifiers, addresses, and port numbers are same as those for FIG. 14.

As described above, in the network system according to the embodiment of the present invention, a possible attempt is made to copy information about each process such as the address, the feature and the like to a single point such as a parent process. This single point (parent process) can be used to manage situations of the entire system. Further, in the network system according to the embodiment of the present invention, it is possible to copy information about each process such as the address, the feature and the like to as many processes as possible. Accordingly, each process can always keep track of information abut the other processes. In the network system according to the embodiment of the present invention, each process can always keep track of a list of available services and access it. In addition, the network system according to the embodiment of the present invention can automatically and promptly take action against an error occurrence or a change in the network configuration for continued system processing.

What is claimed is:

1. A network system having a plurality of network segments, the network system comprising:
a plurality of process portions for information processing and that connect the network segments and that can mutually send and receive a message specified and that can change states to either of first and second states, so as to form a first-state process portion and a second-state process portion, wherein
a group is made up of the process portions connecting one or more network segments;
only the one process portion in the group is in the first state and the other process portions in the group are in the second state;
the first-state process portion stores information of the second-state process portions;
each of the second-state process portions stores information of the first-state process portion, wherein
there is only one process portion in the first state within a first group and a second group is determined by exchanging messages between the first-state process portion of the first group and the first-state process portion of the second group, and
a third group consists of process portions of the first group and process portions of the second group, wherein the process portion determined as the first-state process portion remains in the first state and the process portions not determined are changed into the second state,
multiple second-state process portions share information about each other,
one of the multiple second-state process portions in a group copies information about itself to the first-state process portion in the group,
another second-state process portion reads information about that second-state process portion from the first-state process portion in the group,
information describing information for accessing process portions in the group is copied to the first-state process portion for sharing the information describing information for accessing process portions among process portions in the group,
information describing information for accessing the process portions in the group is copied to the first-state process portion in the group for sharing the information describing information for accessing process portions among the other process portions in the group, and
information for accessing each process portion includes a service identifier, address and port number of the process portion.

2. The network system according to claim 1 wherein the process portion comprises error detection means to detect a communication error.

3. The network system according to claim 2 characterized in that:
a first-state process portion removes a second-state process portion from a storage when the first-state process portion detects a communication error with the second-state process portion.

4. The network system according to claim 2 wherein the second-state process portion changes its state to the first state when the second-state process portion detects a communication error with the first-state process portion.

5. The network system according to claim 1 wherein at least one of
the process portions has time lapse detection means for detecting an elapsed time.

6. The network system according to claim 5 wherein the first-state process portion removes a second-state process portion from storage when the first-state process portion detects no communication with the second-state process portion for a specified period of time.

* * * * *